US009071855B1

(12) United States Patent
Casey

(10) Patent No.: US 9,071,855 B1
(45) Date of Patent: Jun. 30, 2015

(54) PRODUCT AVAILABILITY NOTIFICATIONS

(71) Applicant: Google Inc., Mountain View, CA (US)

(72) Inventor: Matthew Ryan Casey, San Francisco, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/147,265

(22) Filed: Jan. 3, 2014

(51) Int. Cl.
*H04H 60/33* (2008.01)
*H04N 21/24* (2011.01)
*H04N 21/478* (2011.01)
*H04N 21/81* (2011.01)
*H04N 21/8549* (2011.01)
*H04N 21/472* (2011.01)

(52) U.S. Cl.
CPC ......... *H04N 21/2407* (2013.01); *H04N 21/478* (2013.01); *H04N 21/8133* (2013.01); *H04N 21/8549* (2013.01); *H04N 21/47214* (2013.01)

(58) Field of Classification Search
CPC ..................... H04N 21/8549; H04N 21/47214
USPC ............................................. 725/10, 34, 13, 9
See application file for complete search history.

(56) References Cited

U.S. PATENT DOCUMENTS

2004/0163114 A1   8/2004  Rodriguez et al.
2010/0306152 A1*  12/2010 Altay et al. .................... 706/47
2012/0016678 A1   1/2012  Gruber et al.
2012/0159563 A1*  6/2012  Gomez et al. ................. 725/132
2012/0278821 A1* 11/2012  Tran et al. ..................... 719/328
2012/0315014 A1  12/2012  Shuster
2013/0116053 A1*  5/2013  Robert ............................ 463/43
2013/0167168 A1*  6/2013  Ellis et al. ...................... 725/12

FOREIGN PATENT DOCUMENTS

WO      2007078745 A1    7/2007

OTHER PUBLICATIONS

International Search Report and Written Opinion of International Application No. PCT/US2015/010011, mailed Mar. 27, 2015 13 pp.

* cited by examiner

*Primary Examiner* — Nasser Goodarzi
*Assistant Examiner* — Michael Hong
(74) *Attorney, Agent, or Firm* — Shumaker & Sieffert, P.A.

(57) ABSTRACT

In one example, a method includes determining a first video being viewed by a user of a computing device and one or more pieces of preview video associated with one or more videos different from the first video. The method further includes outputting for transmission to the computing device, identifying information for a particular video from the one or more videos, and receiving, from the computing device, an indication of user interest in the particular video. The method further includes responsive to determining at a second time, later than the first time, that the particular video is available for public viewing, outputting, for transmission to the computing device, a notification that the particular video is available for public viewing.

26 Claims, 6 Drawing Sheets

US 9,071,855 B1

PRODUCT AVAILABILITY NOTIFICATIONS

BACKGROUND

Mobile computing devices may be capable of accessing the Internet, executing gaming applications, playing media, sending and receiving messages, as well as providing functionality of a traditional cellular telephone. In some examples, a user of a mobile computing device may have their mobile computing device with them when they view an advertisement. In some situations, a products included in the advertisement may be of interest to the user. However, due to the nature of the product or a current state of the user, the user may be unable to act on their interest at the time the user views the advertisement.

SUMMARY

In one example, a method includes determining, by a computing system, a first video being viewed by a user of a computing device, and determining, by the computing system and at a first time, one or more pieces of preview video associated with one or more videos different from the first video, wherein the one or more videos are not available for public viewing at the first time. In this example, the method also includes outputting, by the computing system, for transmission to the computing device, identifying information for a particular video from the one or more videos, such that the computing device outputs information about the particular video, and receiving, by the computing system and from the computing device, an indication of user interest in the particular video. In this example, the method also includes, responsive to determining at a second time, later than the first time, that the particular video is available for public viewing, outputting, by the computing system and for transmission to the computing device, a notification that the particular video is available for public viewing.

In another example, a computing system includes one or more processors, and at least one module executable by the one or more processors. In this example, the at least one module is executable by the one or more processors to determine a first video being viewed by a user of a computing device, and determine, at a first time, one or more pieces of preview video associated with one or more videos different from the first video, wherein the one or more videos are not available for public viewing at the first time. In this example, the at least one module is also executable by the one or more processors to output, for transmission to the computing device, identifying information for a particular video from the one or more videos, such that the computing device outputs information about the particular video, and receive, from the computing device, an indication of user interest in the particular video. In this example, the at least one module is also executable by the one or more processors to, responsive to determining at a second time, later than the first time, that the particular video is available for public viewing, output, for transmission to the computing device, a notification that the particular video is available for public viewing.

In another example, a method includes receiving, by a computing device and at a first time, an indication of a particular video of one or more videos, wherein the one or more videos are not available for public viewing at the first time, and wherein each video of the one or more videos is associated with one or more pieces of preview video viewed by a user of the computing device prior to the user viewing a non-preview video. In this example, the method also includes outputting, by the computing device, a graphical user interface including information about the particular video, and receiving, by the computing device, an indication of user input detected by an input device, the user input indicating that the user is interested in the particular video. In this example, the method also includes, responsive to determining at a second time, later than the first time, that the particular video is available for public viewing, outputting, by the computing device and for display, a notification that the particular video is available for public viewing.

In another example, a computing device includes one or more processors; and at least one module executable by the one or more processors. In this example, the at least one module is executable by the one or more processors to receive, at a first time, an indication of a particular video of one or more videos, wherein the one or more videos are not available for public viewing at the first time, and wherein each video of the one or more videos is associated with one or more pieces of preview video viewed by a user of the computing device prior to the user viewing a non-preview video. In this example, the at least one module is also executable by the one or more processors to output a graphical user interface including information about the particular video of the one or more videos, and receive an indication of user input detected by an input device, the user input indicating that the user is interested in the particular video. In this example, the at least one module is also executable by the one or more processors to, responsive to determining at a second time, later than the first time, that the particular video is available for public viewing, output for display, a notification that the particular video is available for public viewing.

The details of one or more examples of the disclosure are set forth in the accompanying drawings and the description below. Other features, objects, and advantages will be apparent from the description and drawings, and from the claims.

DETAILED DESCRIPTION

Techniques according to the disclosure may enable a computing device to remind a user of the computing device of his/her interest in a product based on the user's prior indication of interest in an advertisement associated with the product. In some examples, a computing device may, after a user of the computing device has viewed an advertisement of a product which may be unavailable for immediate purchased by the user, receive user input indicating that the user is interested in the product and, at a later time, display a notification to indicate that the product is available for purchase. In this way, as opposed to forgetting his/her interest in the product, the computing device may remind the user of his/her interest when the product becomes available for purchase.

For example, a user of a computing device may, at a theater, view a preview prior to viewing a featured video. Based on the preview video, the user may be interested in a video corresponding to the preview video. However, the corresponding video may not yet be publically available, and by the time it does become publically available, the user may have forgotten his/her interest. In accordance with one or more techniques of this disclosure, a computing device may, receive user input indicating that the user is interested in the corresponding video and, at a later time, display a notification when the corresponding video is available for public viewing.

Figure 1:
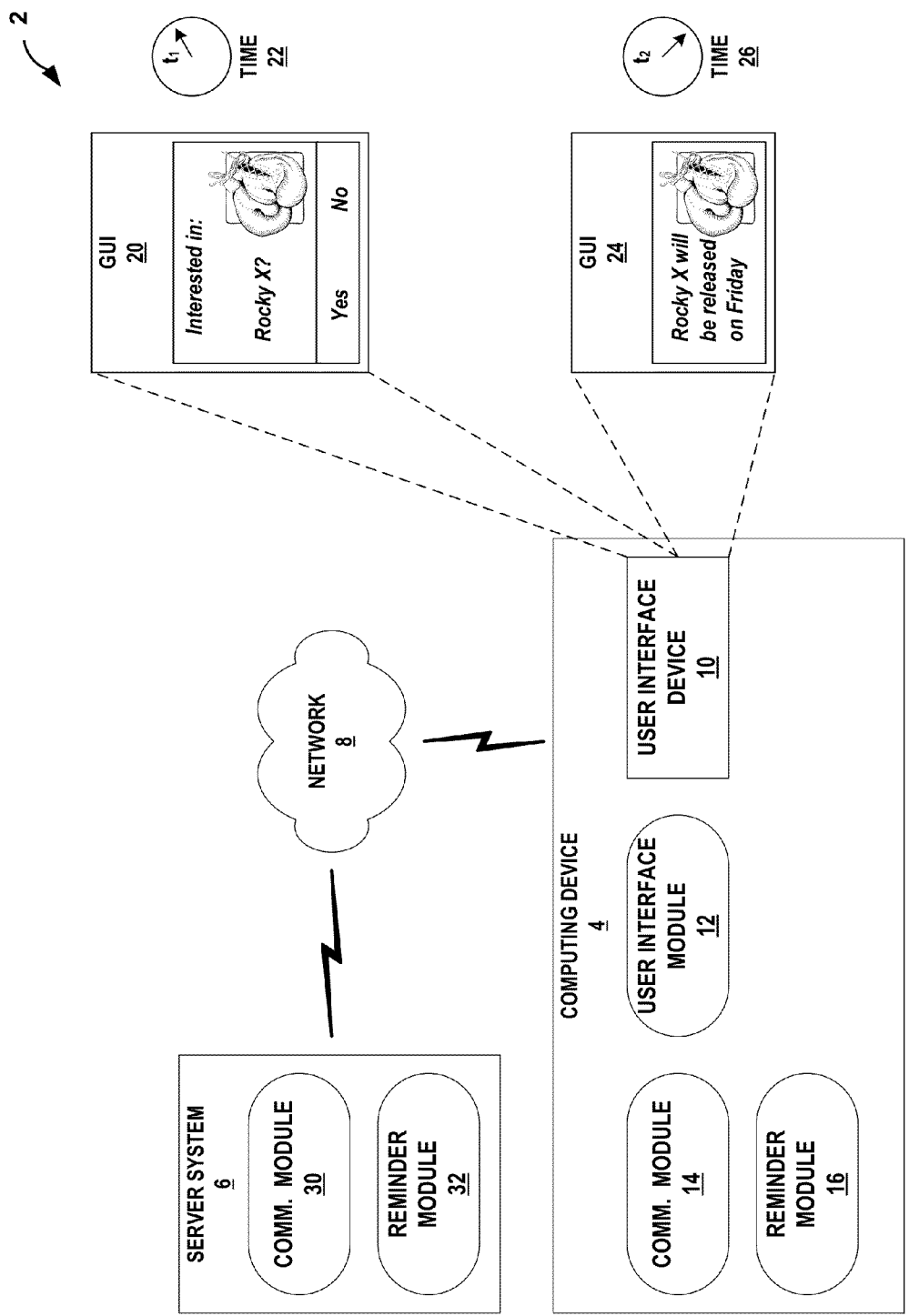
FIG. 1 is a block diagram illustrating an example system for reminding a user of his/her interest in a product, in accordance with one or more techniques of the present disclosure.

FIG. 1 is a block diagram illustrating an example system for reminding a user of his/her interest in a product, in accordance with one or more techniques of the present disclosure. As shown in the example of FIG. 1, system 2 includes computing device 4, server system 6, and network 8. In some examples, computing device 4 may be operatively and/or communicatively coupled to server system 6 by network 8.

In the example of FIG. 1, computing device 4 includes user interface device 10 ("UID 10"), User interface module 12 ("UIM 12"), communication module 14, and reminder module 16. Examples of computing device 4 may include, but are not limited to, portable or mobile devices such as mobile phones (including smart phones), tablet computers, cameras, personal digital assistants (PDAs), etc. Other examples of computing device 4 that implement techniques of this disclosure may include additional components not shown in FIG. 1.

In some examples, computing device 4 may include UID 10. A user associated with computing device 4 may interact with computing device 4 by providing various user inputs into computing device 4, e.g., using the at least one UID 10. In some examples, UID 10 is configured to receive tactile, audio, or visual input. In addition to receiving input from a user, UID 10 can be configured to output content, such as a graphical user interface (GUI) for display. In some examples, UID 10 can include a display and/or a presence-sensitive input device. In some examples, the presence-sensitive input device and the display may be integrated into a presence-sensitive display, which displays the GUI and receives input from the user using capacitive, inductive, surface acoustic wave, and/or optical detection at or near the presence sensitive display. In other examples, the display device can be physically separate from a presence-sensitive device included in computing device 4.

As shown in FIG. 1, computing device 4 may also include UIM 12. UIM 12 can perform one or more functions to receive an indication of input, such as user input, and send the indications of the input to other components associated with computing device 4, such as reminder module 16. UIM 12 may receive indications of user input from various sources, such as UID 10, communication module 14, a network interface, or a user input device. Using the data, UIM 12 may cause other components associated with computing device 4, such as UID 10, to provide output based on the data.

Computing device 4 can also include communication module 14. In some examples, communication module 14 may manage communications between computing device 4 and an external server, such as server system 6. For instance, communication module 14 may receive data from server system 6. As one example, communication module 14 may receive identifying information for a particular product from server system 6. As another example, communication module 14 may receive a notification that the particular product is available for purchase from server system 6. In some examples, communication module 14 may provide the received information to other components of computing device 4. For example, communication module 14 may provide the received notification to UIM 12 for display at UID 10.

In some examples, computing device 4 may include reminder module 16. Reminder module 16 may include functionality remind a user of his/her interest in a product when the product becomes available for purchase. In some examples, reminder module 16 may base the reminders on user input received from the user after the user views an advertisement for the product not yet available for public purchase. Reminder module 16 may exchange data with other components of computing device 4. For instance, reminder module 16 may receive user input from UIM 12 or receive information about a product from communication module 7.

In situations in which the systems discussed herein, such as reminder module 16 and/or reminder module 32 of server system 6, may collect personal information about the user, or may make use of the user's personal information, the user may be provided with an opportunity to control whether, and to what extent, programs or features collect the user's information (e.g., information about the user's social network, social actions or activities, profession, the user's preferences, or the user's current location), or to control whether and/or how to receive content from the content server that may be more relevant to the user. In addition, certain data may be treated in one or more ways before it is stored or used, so that personally identifiable information is removed. For example, the user's identity may be treated so that no personally identifiable information can be determined for the user, or the user's geographic location may be generalized where location information is obtained (such as to a city, ZIP code, or state level), so that a particular location of the user cannot be determined. Thus, the user may have control over how information is collected about the user and used by a content server.

Any of UIM 12, communication module 14, and reminder module 16 (collectively the "computing device modules") may be implemented in various ways. For example, one or more of the computing device modules can be implemented as a downloadable or pre-installed application or "app." In another example, one or more of the computing device modules can be implemented as part of a hardware unit of computing device 4. In another example, one or more of the computing device modules can be implemented as part of an operating system of computing device 4.

In the example of FIG. 1, server system 6 includes communication module 30, and reminder module 32. Examples of server system 6 may include, but are not limited to desktop computers, laptop computers, mainframes, servers, cloud computing systems, and/or combinations of the same.

Communication module 30 may manage communications between server system 6 and a computing device, such as computing device 4. For instance, communication module 30 may exchange information with computing device 4. As one example, communication module 30 may send identifying information for a product to computing device 4. As another example, communication module 30 may receive an indication of user interest in a product from computing device 4. In some examples, communication module 30 may exchange information with other components of server system 6. For example, communication module 20 may provide the received indication of user interest in the product to reminder module 32.

Reminder module 32 may include functionality to remind a user of a computing device of his/her interest in a product when the product becomes available for purchase. In some examples, reminder module 32 may base the reminders on user interest received from a computing device (e.g., computing device 4). In some examples, reminder module 32 may include functionality to determine one or more advertisements viewed by a user of a computing device. Reminder module 32 may exchange data with other components of server system 6. For instance, reminder module 32 may output identifying information for a particular product to communication module 30 and receive an indication of user interest about a product from communication module 30.

Any of communication module 30, reminder module 32, and application modules 34 (collectively the "server system modules") may be implemented in various ways. For example, one or more the server system modules can be implemented as a downloadable or pre-installed application or "app." In another example, one or more of the server system modules can be implemented as part of a hardware unit of server system 6. In another example, one or more of the server system modules can be implemented as part of an operating system of server system 6.

Rather than allowing a user of computing device 4 to forget his/her interest in a product that is not yet available for purchase, techniques of this disclosure may enable computing device 4 and/or server system 6 to determine the user's interest in the product based on the user's interest in an advertisement (e.g., a preview video) that is associated with the product and notify the user when the product becomes available for purchase (e.g., public viewing). In some examples, the advertisement may be a preview video, such as a movie trailer; a commercial, such as a radio commercial or a television commercial; an internet advertisement, such as a banner ad, video advertisement shown prior to another video (e.g., a non-preview video); and the like.

Reminder module 32 may also determine, at a first time, one or more advertisements (e.g., one or more pieces of preview video) associated with one or more products. In some examples, the one or more products may not be available for purchase at the first time. Reminder module 32 may output, for transmission to computing device 4, information for a particular product from the one or more products. For instance, reminder module 32 may provide the information to communication module 30 for transmission to communication module 14 of computing device 4 via network 8. In some examples, the information may include identifying information such as one or more of a title of the particular product, a link to information about the particular product, an identification number of the particular product, one or more entities involved in the creation of the particular product, one or more graphics associated with the particular product, and the like.

Reminder module 16 of computing device 4 may receive the information about the particular product. In some examples, reminder module 16 may also receive an indication of one or more advertisements. In some examples, reminder module 16 may receive the indication from server system 6. For instance, communication module 14 may receive the indication from communication module 30 via network 8 and then provide the indication to reminder module 16. In some examples, reminder module 16 may determine the one or more advertisements independent of or in tandem with reminder module 32.

Reminder module 16 may output a graphical user interface (GUI) that includes information about the particular product. In some examples, the GUI may include some of the identifying information of the particular product. For instance, the GUI may include a title of the particular product and a graphic associated with the particular product (e.g., a thumbnail of another advertisement associated with the product). In some examples, the GUI may include one or more graphical prompts for the user to provide user input regarding the user's interest in the particular product. For example, the GUI may include text praised in the form of a question which may prompt the user to indicate his/her interest in the particular product. As another example, the GUI may include one or more selectable regions which may prompt the user to indicate his/her interest in the particular product. In some examples, the GUI may prompt the user to provide input that indicates whether or not they are interested in the particular product (e.g., "yes or no"). In some examples, the GUI may prompt the user to provide input that indicates a level of interest in the particular product (e.g., X out of Y stars).

UIM 12 may receive the GUI and cause UID 10 to display GUI 20 that includes the information about the particular product at first time 22. In the example of FIG. 1, the particular product is a video and GUI 20 includes a title of the video "Rocky X" and a graphic associated with the video (i.e., boxing gloves). Also, as shown in the example of FIG. 1, GUI 20 includes both text phrased in the form a question and "Yes" and "No" regions which may prompt the user of computing device 4 to indicate his/her interest in the particular product.

The user may provide input that indicates the user's interest level in the particular product. For instance, the user may select one or more of the selectable regions displayed at UID 10. UIM 12 may receive an indication of the user input from UID 10 and provide the indication to reminder module 16. Reminder module 16 may then receive the indication and determine the user's interest level in the particular product. In some examples, reminder module 16 may output, for transmission to server system 6, the indication of the user's interest in the particular product.

Communication module 30 of server system 6 may receive the indication of the user interest in the particular product and provide the indication to reminder module 32. Reminder module 32 may then determine when the particular product will be available for purchase. For example, reminder module 32 may determine a release date for the particular product.

In some examples, reminder module 32 may determine when the particular product is available for purchase at a second time that may be later than the first time (i.e., when reminder module 32 determined the one or more advertisements). In some examples, if reminder module 32 is unable to determine when the particular product will be available for purchase within a period of time (e.g., one day) after receiving the indication of the user interest, reminder module 32 may periodically attempt to determine when the particular product will be available for purchase. In some examples, if reminder module 32 is able to determine when the particular product will be available for purchase within the period of time, reminder module 32 may create record that causes server system 6 and/or computing device 4 to remind the user of his/her interest on or around the point when the particular product will be available for purchase. In some examples, the record may be an entry of an electronic calendar of the user. In some examples, the record may be a scheduled task that causes reminder module 32 to remind the user.

In some examples, reminder module 32 may determine when the particular product is available for purchase based on a geographical location of the user relative to a location of a product source (e.g., a store where the product may be purchased. For example, if the product is a food product, reminder module 32 may determine that the product is available for purchase when computing device 4 is currently located in or near a grocery store.

In any case, responsive to determining that the particular product is available for purchase, reminder module 32 may output, for transmission to computing device 4, a notification that the particular product is available for purchase. For instance, reminder module 32 may provide the notification to communication module 30 for transmission to communication module 14 of computing device 4 via network 8. In some examples, the notification may include information regarding the purchase of the particular product. For instance, where the particular product is a video, the notification may include information regarding the purchase of tickets to a showing of the particular product.

Responsive to determining that the particular product is available for purchase, reminder module 16 may output, for display, a notification that the particular product is available for purchase. For instance, reminder module 16 may output a GUI that indicates that the particular product is available for purchase. In some examples, the GUI may include the title of the particular product and a graphic associated with the particular product. In some examples, the notification may include information regarding the purchase of the particular product. For instance, where the particular product is a video, the notification may include information regarding the purchase of tickets to a showing of the particular product.

UIM 12 may receive the GUI and cause UID 10 to display GUI 24 that includes the notification at second time 26. In the example of FIG. 1, GUI 24 includes the title of the particular product "Rocky X" and a graphic associated with the particular product (i.e., boxing gloves). Also, as shown in the example of FIG. 1, GUI 24 includes text that indicates that the particular product will be released on Friday.

In any case, by outputting the notification that the particular product is available for purchase, computing device 4 and/or server system 6 may increase the likelihood that the user of computing device 4 will remember his/her interest in the particular product.

Figure 2:
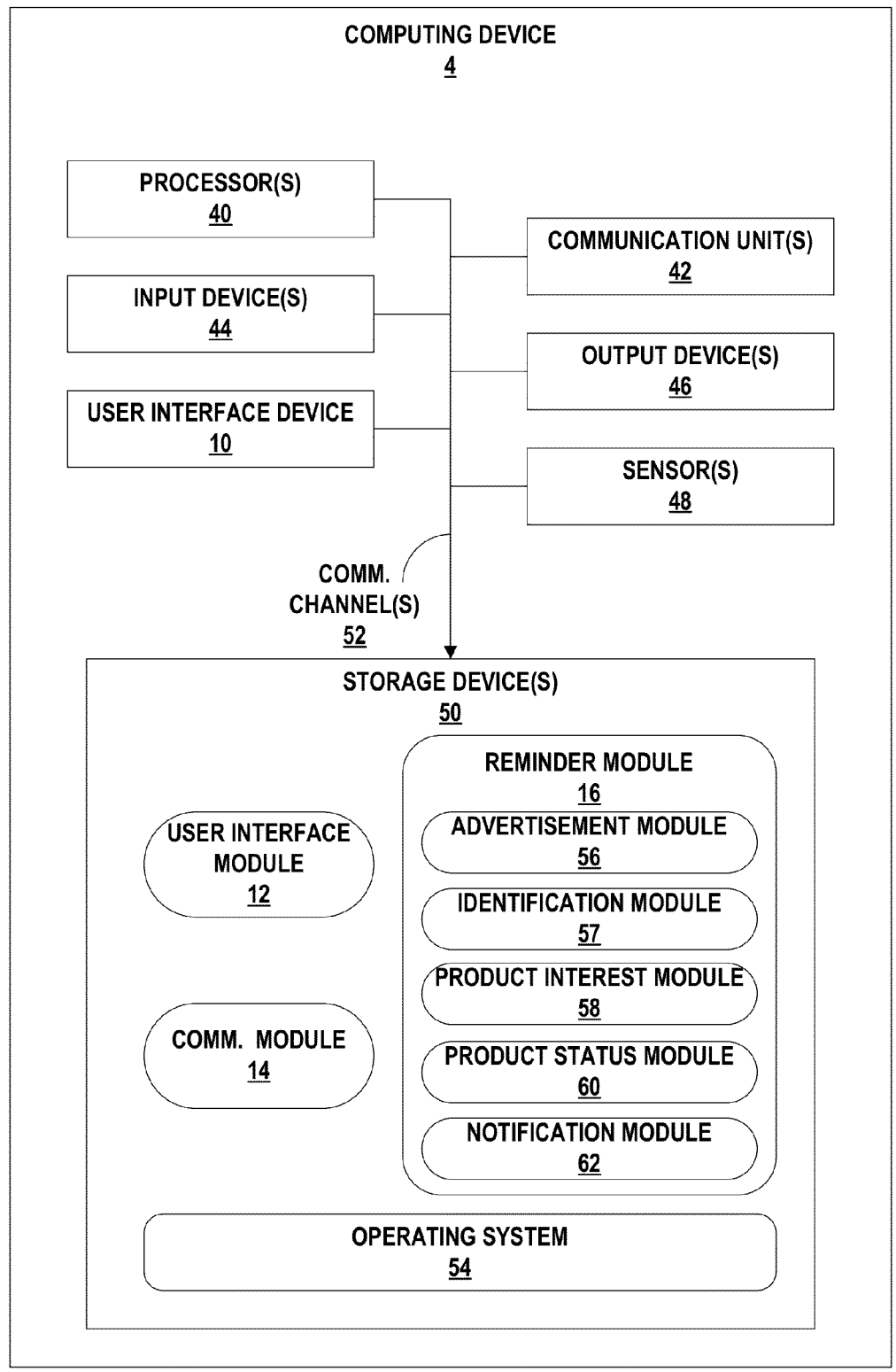
FIG. 2 is a block diagram illustrating an example computing device that reminds a user of his/her interest in a product, in accordance with one or more techniques of the present disclosure.

FIG. 2 is a block diagram illustrating an example computing device that reminds a user of his/her interest in a product, in accordance with one or more techniques of the present disclosure. FIG. 2 illustrates one particular example of computing device 4, and many other examples of computing device 4 may be used in other instances and may include a subset of the components included in example computing device 4 or may include additional components not shown in FIG. 2.

As shown in the example of FIG. 2, computing device 4 includes one or more processors 40, one or more communication units 42, one or more input devices 44, one or more output devices 46, user interface device 10 ("UID 10"), one or more sensors 48, and one or more storage devices 50. Storage devices 50 of computing device 4 also include user interface module 12 ("UIM 12"), communication module 14, reminder module 16, and operating system 54. Computing device 4 can include additional components that, for clarity, are not shown in FIG. 2. For example, computing device 4 can include a battery to provide power to the components of computing device 4. Similarly, the components of computing device 4 shown in FIG. 2 may not be necessary in every example of computing device 4. For example, in some configurations, computing device 4 may not include output devices 46.

Communication channels 52 may interconnect each of the components 10, 40, 42, 44, 46, 48, and 50 for inter-component communications (physically, communicatively, and/or operatively). In some examples, communication channels 52 may include a system bus, a network connection, an inter-process communication data structure, or any other method for communicating data.

One or more processors 40 may implement functionality and/or execute instructions within computing device 4. For example, processors 40 on computing device 4 may receive and execute instructions stored by storage devices 50 that execute the functionality of modules 12, 14, and 16. These instructions executed by processors 40 may cause computing device 4 to read/write/etc. information, such as one or more data files stored within storage devices 50 during program execution. Processors 40 may execute instructions of modules 12, 14, 16, and 50 to cause UID 10 to output one or more graphical indications of incoming communications for display at UID 10 as content of a user interface. That is, modules 12, 14, and 16 may be operable by processors 40 to perform various actions or functions of computing device 4, for instance, causing UID 10 to a present a graphical user interface at UID 10.

One or more communication units 42 of computing device 4 may communicate with external devices via one or more wired and/or wireless networks by transmitting and/or receiving network signals on the one or more networks. Examples of communication unit 42 include a network interface card (e.g. such as an Ethernet card), an optical transceiver, a radio frequency transceiver, a GPS receiver, or any other type of device that can send and/or receive information. Other examples of communication units 42 may include short wave radios, cellular data radios, wireless network radios, as well as universal serial bus (USB) controllers.

One or more input devices 44 of computing device 4 may receive input. Examples of input are tactile, audio, and video input. One or more of input devices 44 of computing device 4, in one example, may include a presence-sensitive display, touch-sensitive screen, mouse, keyboard, voice responsive system, video camera, microphone, or any other type of device for detecting input from a human or machine.

One or more output devices 46 of computing device 4 may generate output. Examples of output are tactile, audio, and video output. One or more of output devices 46 of computing device 4, in one example, may include a presence-sensitive display, sound card, video graphics adapter card, speaker, cathode ray tube (CRT) monitor, liquid crystal display (LCD), or any other type of device for generating output to a human or machine.

In some examples, UID 10 of computing device 4 may include functionality of input devices 44 and/or output devices 46. In the example of FIG. 2, UID 10 may be or may include a presence-sensitive input device. In some examples, a presence sensitive input device may detect an object at and/or near a screen. As one example range, a presence-sensitive input device may detect an object, such as a finger or stylus that is within two inches or less of the screen. The presence-sensitive input device may determine a location (e.g., an (x,y) coordinate) of a screen at which the object was detected. In another example range, a presence-sensitive input device may detect an object six inches or less from the screen and other ranges are also possible. The presence-sensitive input device may determine the location of the screen selected by a user's finger using capacitive, inductive, and/or optical recognition techniques. In some examples, presence sensitive input device also provides output to a user using tactile, audio, or video stimuli as described with respect to output device 46, e.g., at a display. In the example of FIG. 2, UID 10 may present one or more graphical user interfaces, such as graphical user interfaces 20 and 24 of FIG. 1.

While illustrated as an internal component of computing device 4, UID 10 also represents and external component that shares a data path with computing device 4 for transmitting and/or receiving input and output. For instance, in one example, UID 10 represents a built-in component of computing device 4 located within and physically connected to the external packaging of computing device 4 (e.g., a screen on a mobile phone). In another example, UID 10 represents an external component of computing device 4 located outside and physically separated from the packaging of computing device 4 (e.g., a monitor, a projector, etc. that shares a wired and/or wireless data path with a tablet computer).

Sensors 48 may be configured to detect a location of computing device 4 and may collect other information associated with computing device 4. For instance, sensors 48 may be configured to measure the geographical location, rotation, velocity, and/or acceleration of computing device 4. Examples of sensors 48 that detect and/or measure a location of computing device 4 may include, but are not limited to, GPS receivers, indoor positioning sensors, accelerometers, and gyroscopes.

One or more storage devices 50 within computing device 4 may store information for processing during operation of computing device 4 (e.g., computing device 4 may store data that modules 12, 14, and 16 may access during execution at computing device 4). In some examples, storage device 50 is a temporary memory, meaning that a primary purpose of storage device 50 is not long-term storage. Storage devices 50 on computing device 10 may configured for short-term storage of information as volatile memory and therefore not retain stored contents if powered off. Examples of volatile memories include random access memories (RAM), dynamic random access memories (DRAM), static random access memories (SRAM), and other forms of volatile memories known in the art.

Storage devices 50, in some examples, also include one or more computer-readable storage media. Storage devices 50 may be configured to store larger amounts of information than volatile memory. Storage devices 50 may further be configured for long-term storage of information as non-volatile memory space and retain information after power on/off cycles. Examples of non-volatile memories include magnetic hard discs, optical discs, floppy discs, flash memories, or forms of electrically programmable memories (EPROM) or electrically erasable and programmable (EEPROM) memories. Storage devices 50 may store program instructions and/or information (e.g., data) associated with modules 12, 14, and 16 and operating system 54.

Operating system 54, in some examples, controls the operation of components of computing device 4. For example, operating system 54, in one example, facilitates the communication of UIM 12, communication module 14, and reminder module 16 with processors 40, one or more communication units 42, one or more input devices 44, one or more output devices 46, UID 10, and one or more sensors 48. UIM 12, communication module 14, and reminder module 16 may each include program instructions and/or data that are executable by computing device 4 (e.g., by one or more processors 40). As one example, reminder module 16 can include instructions that cause computing device 4 to perform one or more of the operations and actions described in the present disclosure.

UIM 12 may cause UID 10 to output a graphical user interface (e.g., graphical user interfaces 20, 24) for display, as a user of computing device 4 views output and/or provides input at UID 10. UIM 12 and UID 10 may receive one or more indications of input from a user as the user interacts with the graphical user interface, at different times and when the user and computing device 4 are at different locations. UIM 12 and UID 10 may interpret inputs detected at UID 10 (e.g., as a user provides one or more gestures at one or more locations of UID 10 at which the graphical user interface is displayed) and may relay information about the inputs detected at UID 10 to one or more associated platforms, operating systems, applications, and/or services executing at computing device 4, to cause computing device 4 to perform functions.

UIM 12 may receive information and instructions from one or more associated platforms, operating systems, applications, and/or services executing at computing device 4 (e.g., communication module 14, reminder module 16, etc.) for generating a graphical user interface. In addition, UIM 12 may act as an intermediary between the one or more associated platforms, operating systems, applications, and/or services executing at computing device 4 and various output devices of computing device 4 (e.g., speakers, LED indicators, audio or electrostatic haptic output device, etc.) to produce output (e.g., a graphic, a flash of light, a sound, a haptic response, etc.) with computing device 4.

In accordance with one or more techniques of this disclosure, communication module 14 may be operated by processors 40 to receive, at a first time, information about a particular product that is not available for purchase by a user of computing device 4 at the first time. In some examples, the information may be received from an external device, such as server system 6 of FIG. 1. Communication module 14 may then be operable by processors 40 to provide the information to advertisement module 56 of reminder module 16.

Advertisement module 56 may be operable by processors 40 to receive the information about the particular product and determine that the user of computing device 4 has observed an advertisement for the particular product. For example, where the particular product is for a video, advertisement module 56 may determine that the user has viewed a preview video associated with the video. As another example, where the product is a new type of potato chip, advertisement module 56 may determine that the user has viewed a commercial for the new type of potato chip. Advertisement module 56 may then be operable by processors 40 to provide an indication that the user has viewed the advertisement for the particular product to product interest module 58.

In some examples, identification module 57 may be operable by processors 40 to determine, based the advertisement observed by the user of computing device 4, the particular product associated with the advertisement. In some examples, identification module 57 may determine the particular product associated with the advertisement by receiving information that identifies the particular product from an external device, such as server system 6 of FIG. 1. As another example, where the advertisement is associated with an audio component, identification module 57 may determine the particular product by receiving (e.g., from one of more of input devices 44) audio data associated with the advertisement. In some examples, identification module 57 may send the audio data to an external device, such as server system 6 of FIG. 1, for processing. In some examples, identification module 57 may determine the particular product by comparing the audio data associated with the advertisement with audio data associated with one or more advertisements available at a website. For example, where the advertisement is a preview video such as a movie trailer, identification module 57 may determine the movie associated with the trailer by comparing the audio data of the movie trailer with audio data of one or more movie trailers available for viewing at a video sharing website.

Product interest module 58 may be operable by processors 40 to receive the indication and determine whether or not the user is interested in the particular product. For instance, product interest module 58 may output a graphical user interface (GUI) that prompts the user to indicate his/her interest in the particular product. For example, where the particular product is a video, product interest module 58 may include a title of the video and a graphic associated with the video (e.g., a thumbnail of a poster associated with the video) within the GUI. As another example, where the product is the new type of potato chip, product interest module 58 may include a brand name of the new type of potato chip and a graphic associated with the new type of potato chip (e.g., a thumbnail of the packaging in which the potato chips are sold) within the GUI. Product interest module 58 may be operable by processors 40 to provide an indication of the user's interest in the particular product to communication module 14 and/or product status module 60. Where product interest module 58 provides the indication to communication module 14, communication module 14 may be operable by processor 40 to send the indication to an external device, such as server system 6 of FIG. 1.

In some examples, the GUI may include one or more graphical prompts for the user to provide user input regarding the user's interest in the particular product. For example, the GUI may include text phrased in the form of a question, which may prompt the user to indicate his/her interest in the particular product. As another example, the GUI may include one or more selectable regions, which may prompt the user to indicate his/her interest in the particular product. In some examples, the GUI may prompt the user to provide input that indicates whether or not they are interested in the particular product (e.g., "yes or no"). In some examples, the GUI may prompt the user to provide input that indicates a level of interest in the particular product (e.g., X out of Y stars).

In some examples, such as where the user views the advertisement prior to viewing a video, product interest module 58 may be operable by processors 40 to determine whether or not the user is interested in the particular product in response to determining that the video has finished playing. Product interest module 58 may determine that the video has finished playing in a number of ways. For example, where the user views the video in a theater, product interest module 58 may determine that the video has finished playing by determining that the user has left the theater (e.g., by determining that a currently location of computing device 4 is not within a threshold distance of the theater). As another example, product interest module 58 may determine that the video has finished playing based on a runtime of the video (e.g., if the video is 120 minutes long, product interest module 58 may determine that the video has finished playing at a point in time 120 minutes after a start time of the video). As yet another example, product interest module 58 may determine that the video has finished playing by determining that a display of computing device 4 is on (e.g., by determining that a display of UID 10 is on). As yet another example, product interest module 58 may determine that the video has finished playing by determining that computing device 4 has received input causing computing device 4 to unmute (e.g., by determining that computing device 4 has changed from a mute or a vibrate mode to a sound mode). As still another example, product interest module 58 may determine that the video has finished playing by determining that computing device 4 has exited a limited functionality operating mode (e.g., by determining that computing device 4 has received the correct response to a lock screen).

In some examples, product interest module 58 may be further operable by processors 40 to determine the particular product based on information indicating user interest in one or more other products. In some examples, product interest module 58 may receive the information indicating user interest in one or more other products from a database. Product interest module 58 may compare one or more attributes of the one or more other products with one or more attributes of the one or more products. Based at least in part on the comparison, product interest module 58 may determine the particular product. For instance, product interest module 58 may determine a product of the one or more products as the particular product if the one or more attributes of the one or more other products are similar to the one or more attributes of the product.

As one example, where the one or more other products and the one or more products are videos, the one or more attributes may include a genre, an actor, an actress, a director, a series, a distributer, etc. For instance, product interest module 58 may determine a video of the one or more videos if at least one of the one or more other videos in which the user is interested has a genre and an actor in common with the video. In some examples, product interest module 58 may determine the video with a confidence level. In such examples, product interest module 58 may determine the video with a higher confidence level where more videos of the one or more other videos which share attributes with the video of the one or more videos. In some examples, product interest module 58 may weight the attributes differently when determining the confidence level. For instance, product interest module 58 determine a higher confidence level where the one or more other videos have an actor in common with the video of the one or more videos than where the one or more other videos have an genre in common with the video of the one or more videos.

As another example, where the one or more other products and the one or more products are food products, the one or more attributes may include an eating occasion (e.g., breakfast, lunch, dinner, dessert, meal, snack, etc.), a flavor category (e.g., salty, sweet, spicy, sour, etc.), a texture category (e.g., crunchy, soft, chewy, etc.), and other such attributes. For instance, product interest module 58 may determine a food product of the one or more food products if they have the same eating occasion and the same flavor category.

Product interest module 58 may then determine one or more products of the plurality of products based on one or more preferences of the user of computing device 4. For instance, where the plurality of products is a plurality of videos, product interest module 58 may determine one or more videos of the plurality of videos based on the type of video preferred by the user (e.g., cat videos, action videos, romantic videos, etc.). Product interest module 58 may then determine whether or not the user is interested in the determined one or more products of the plurality of products.

In some examples, product interest module 58 may be further operable by processors 40 to determine one or more additional videos in which the user is likely to be interested. In some examples, product interest module 58 may base the determination on the received indication of user interest in the particular video. For example, where the particular product is a comedy movie and product interest module 58 receives an indication of user input indicating that the user is interested in the particular product, product interest module 58 may determine that the user is likely to be interested in one or more other comedy movies. Product interest module 58 may be further operable by processors 40 to output an indication of a preview video associated with the additional products. To continue with the previous example, product interest module 58 may output a link to a preview video associated with one or more of the comedy movies.

Product status module 60 may be operable by processors 40 to determine whether or not the particular product in which the user is interested in is available for purchase. In some examples, product status module 60 may determine that the particular product is available for purchase in tandem with or independent of an external device, such as server system 6 of FIG. 1. In some examples, product status module 60 may determine that the particular product is available for purchase by determining a release date for the particular product. In some examples, purchase may not require the exchange of money (i.e., the particular product may be available at no cost). In some examples, where the particular product is a video, the release data may be the date on which viewing rights may be acquired for the video. For instance, viewing rights may be acquired for the video if the video is available for public viewing in theaters, if physical media containing the video is publically available, if a license to stream the video is publically available, and/or if a license to download the video is publically available.

As another example, product status module 60 may determine that the particular product is available for purchase by determining that a location of computing device 4 is near a location where the particular product is available for purchase. For instance, product status module 60 may receive data from one or more of sensors 48 that indicates a current location of computing device 4. Product status module 60 may also receive data from an external device, such as server system 6, which indicates the location of one or more sources at which the particular product is available for purchase. In some examples, the data received from the external device may also indicate the location of the particular product within at least one of the product sources. Product status module 60 may compare the current location of computing device 4 with the location of the one or more product sources. Product status module 60 may determine that the particular product is available for purchase if a distance between the current location of computing device 4 and the location of the one or more product sources is less than a first threshold value (e.g., one mile, five minute travel time, etc.). In some examples, product status module 60 may determine that the particular product is available for purchase if a distance between the current location of computing device 4 and the location of the particular product within a product source is less than a second threshold value (e.g., 50 feet). In some examples, product status module 60 may determine that the particular product is available for purchase where a current location of computing device 4 is within the same aisle as the particular product.

In some examples, product status module 60 may determine that the particular product is available for purchase based on a location history of computing device 4. For instance, if the particular product is available for purchase at a product source, product status module 60 may determine that the particular product is available for purchase if the location history of computing device 4 suggests that computing device 4 will be at a location of the product source within a threshold period of time (e.g., 15 min, 1 hour, 1 day, etc.). For example, if the particular product is potato chips, which are available for purchase at a grocery store, product status module 60 may determine that the potato chips are available for purchase if the location history of computing device 4 suggests that computing device 4 will be at the grocery store sometime that day.

In some examples, product status module 60 may determine when the particular product is available for purchase at a second time that may be later than the first time (i.e., a time later than the time at which advertisement module 56 determined the advertisement). In some examples, if product status module 60 is unable to determine when the particular product will be available for purchase within a period of time (e.g., one day) after product interest module 58 receives the indication of the user interest, product status module 60 may periodically attempt to determine when the particular product will be available for purchase. In some examples, if product status module 60 is able to determine when the particular product will be available for public viewing within the period of time, product status module 60 may create record that causes notification module 62 to remind the user of his/her interest on or around the point when the particular video will be available for public viewing. In some examples, the record may be an entry of an electronic calendar of the user. In some examples, the record may be a scheduled task that causes notification module 62 to remind the user.

Notification module 62 may be operable by processors 40 to output a notification that the particular product is available for purchase. In some examples, notification module 62 may output the notification responsive to product status module 60 determining that the particular product is available for purchase. In some examples, notification module 62 may output the notification by outputting a GUI that indicates that the particular product is available for purchase. For instance, notification module 62 may provide the GUI to UIM 12, which may cause UID 10 to display the GUI. In some examples, where the particular product is a video, the GUI may include the title of the particular video and a graphic associated with the particular video.

In some examples, notification module 62 may output the notification by causing one or more of output devices 46 to emit a sound (e.g., a beep) and/or by causing one or more of output devices 46 to vibrate. In some examples, notification module 62 may output the notification by causing a message to appear within a social network account associated with the user of computing device 4. In some examples, notification module 62 may output the notification by sending an e-mail message to an e-mail account associated with the user of computing device 4.

Notification module 62, in some examples, may output information regarding the purchase of the particular product. For example, where the particular product is a video, notification module 62 may output the notification such that it includes information regarding the acquisition of viewing rights to the video. For instance, the notification may include information regarding the purchase of tickets to a showing of the particular video.

Figure 3:
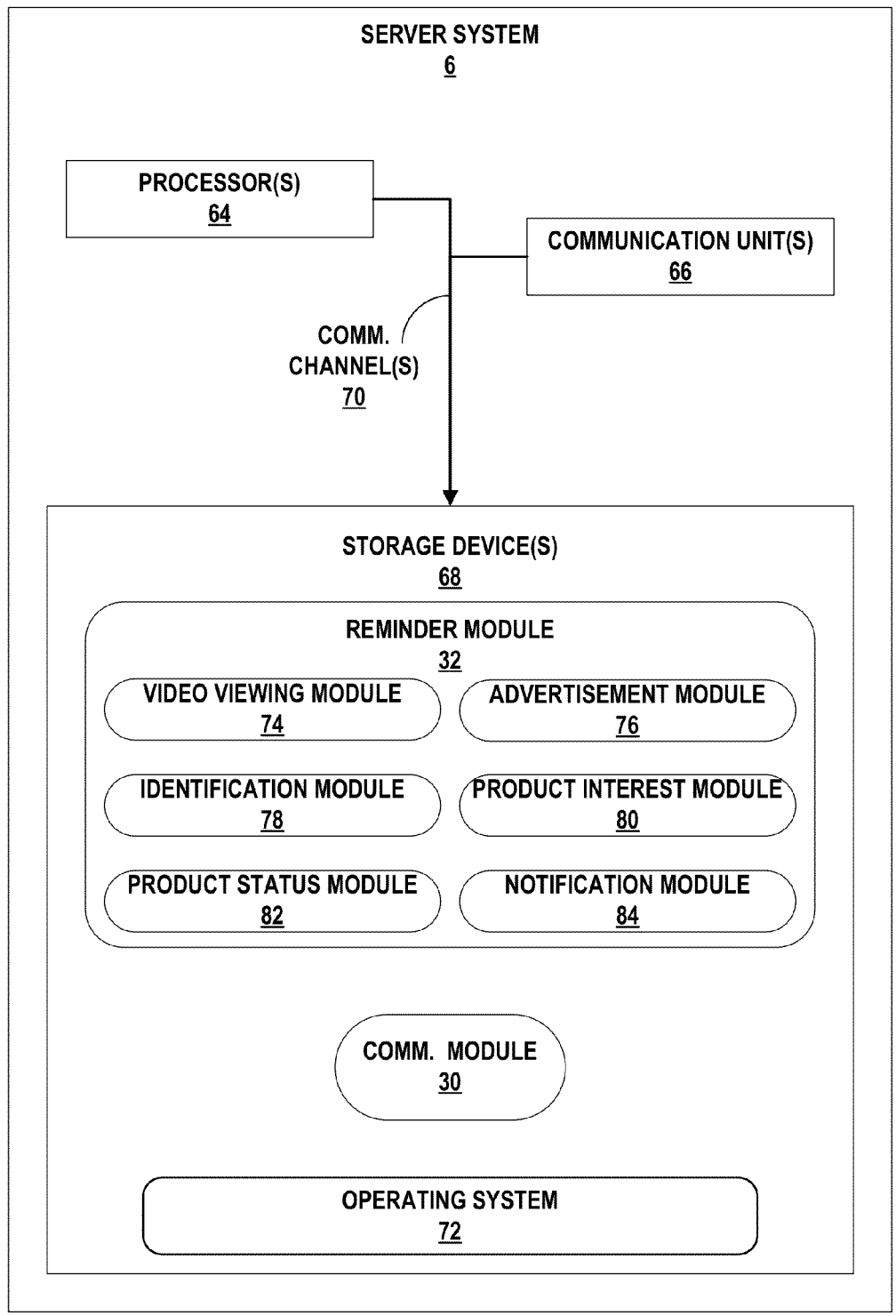
FIG. 3 is a block diagram illustrating an example server system, in accordance with one or more techniques of the present disclosure.

FIG. 3 is a block diagram illustrating an example server system that reminds a user of his/her interest in a product, in accordance with one or more techniques of the present disclosure. FIG. 3 illustrates one particular example of server system 6, and many other examples of server system 6 may be used in other instances and may include a subset of the components included in example server system 6 or may include additional components not shown in FIG. 3.

As shown in the example of FIG. 3, server system 6 includes one or more processors 64, one or more communication units 66, and one or more storage devices 68. Storage devices 68 of server system 6 also include communication module 30, reminder module 32, and operating system 72.

Server system 6 can include additional components that, for clarity, are not shown in FIG. 3. For example, server system 6 can include multiple server devices over which the computing load of server system 6 may be distributed. Similarly, the components of server system 6 shown in FIG. 3 may not be necessary in every example of server system 6.

Communication channels 70 may interconnect each of the components 64, 66, and 68 for inter-component communications (physically, communicatively, and/or operatively). In some examples, communication channels 70 may include a system bus, a network connection, an inter-process communication data structure, or any other method for communicating data.

One or more processors 64 may implement functionality and/or execute instructions within server system 6. For example, processors 64 on server system 6 may receive and execute instructions stored by storage devices 68 that execute the functionality of modules 30 and 32. These instructions executed by processors 64 may cause server system 6 to read/write/etc. information, such as one or more data files stored within storage devices 68 during program execution.

One or more communication units 66 of server system 6 may communicate with external devices via one or more wired and/or wireless networks by transmitting and/or receiving network signals on the one or more networks. Examples of communication unit 66 include a network interface card (e.g. such as an Ethernet card), an optical transceiver, a radio frequency transceiver, a GPS receiver, or any other type of device that can send and/or receive information. Other examples of communication units 66 may include short wave radios, cellular data radios, wireless network radios, as well as universal serial bus (USB) controllers.

One or more storage devices 68 within server system 6 may store information for processing during operation of server system 6 (e.g., server system 6 may store data that modules 30 and 32 may access during execution at server system 6). In some examples, storage device 68 is a temporary memory, meaning that a primary purpose of storage device 68 is not long-term storage. Storage devices 68 on server system 6 may be configured for short-term storage of information as volatile memory and therefore not retain stored contents if powered off. Examples of volatile memories include random access memories (RAM), dynamic random access memories (DRAM), static random access memories (SRAM), and other forms of volatile memories known in the art.

Storage devices 68, in some examples, also include one or more computer-readable storage media. Storage devices 68 may be configured to store larger amounts of information than volatile memory. Storage devices 68 may further be configured for long-term storage of information as non-volatile memory space and retain information after power on/off cycles. Examples of non-volatile memories include magnetic hard discs, optical discs, floppy discs, flash memories, or forms of electrically programmable memories (EPROM) or electrically erasable and programmable (EEPROM) memories. Storage devices 68 may store program instructions and/or information (e.g., data) associated with modules 30 and 32 and operating system 72.

Operating system 72, in some examples, controls the operation of components of server system 6. For example, operating system 72, in one example, facilitates the communication of communication module 30 and reminder module 32 with processors 64 and one or more communication units 66. Communication module 30 and reminder module 32 may each include program instructions and/or data that are executable by server system 6 (e.g., by one or more processors 64). As one example, reminder module 32 can include instructions that cause server system 6 to perform one or more of the operations and actions described in the present disclosure.

In accordance with one or more techniques of this disclosure, video viewing module 74 of reminder module 32 may be operable by processors 64 to determine a video being viewed by a user of a computing device, such as computing device 4 of FIG. 1. In some examples, the video may be a movie. In some examples, video viewing module 74 may determine the video by determining that the user has acquired viewing rights to the video. In some examples, the user may acquire viewing rights by purchasing or receiving theater tickets to a showing of the video, purchasing or receiving a license to stream the video, and/or purchasing or receiving a license to download the video. In some examples, video viewing module 74 may parse one or more communication accounts of the user (e.g., e-mail accounts, social networks, etc.) to determine that the user has acquired viewing rights to the video.

Advertisement module 76 of reminder module 32 may be operable by processors 64 to determine one or more advertisements determined to be viewed by the user of the computing device. The one or more advertisements may be associated with one or more products, which may not be available for purchase at the time at which the user views the one or more advertisements. In some examples, at least one of the one or more advertisements may be a preview video associated with a video not yet available for public viewing. In other words, at least one of the advertisements may be a movie trailer promoting a movie that has not yet been released. In some examples, advertisement module 76 may determine the one or more advertisements by querying a database that includes information indicating which advertisements are scheduled to be output prior to the video determined by video viewing module 74.

Identification module 78 of reminder module 32 may be operable by processors 64 to identify a particular product associated with at least one of the advertisements determined by advertisement module 76. In some examples, identification module 78 may identify the particular product by querying the same database queried by advertisement module 78. In some examples, identification module 78 may analyze audio data associated with an advertisement received from a computing device, such as computing device 4, to identify the particular product. For example, identification module 78 may compare the audio data associated with the advertisement with audio data associated with one or more advertisements available for viewing at a video sharing website to identify the particular product. Identification module 78 may then output, for transmission to the computing device, identifying information for the particular product. For example, identification module 78 may cause one or more of communication units 66 to transmit the identifying information to computing device 4.

Product interest module 80 of reminder module 32 may be operable by processors 64 to determine a level of interest that a user of a computing device, such as computing device 4, has in the particular product (e.g., the particular product identified by identification module 78). For instance, product interest module 80 may receive, from the computing device, an indication of user interest in the particular product. In some examples, product interest module 80 may determine, based on the received indication of user interest in the particular product, one or more additional products in which the user is likely to be interested.

In some examples, product interest module 80 may be further operable by processors 64 to determine the particular product based on one or more preferences of the user of a computing device, such as computing device 4. In some examples, product interest module 80 may determine that the user of the computing device has viewed a plurality of preview videos, each corresponding to a product of a plurality of products. Product interest module 80 may then determine one or more products of the plurality of products based on one or more preferences of the user of the computing device. For instance, where the plurality of products is a plurality of videos, product interest module 80 may determine one or more videos of the plurality of videos based on the type of video preferred by the user (e.g., cat videos, action videos, romantic videos, etc.). Product interest module 80 may then determine whether or not the user is interested in the determined one or more products of the plurality of products. For instance, product interest module 80 may output an indication to computing device 4 that causes computing device 4 to output a graphical user interface including information about the determined one or more products of the plurality of products.

In some examples, product interest module 80 may be further operable by processors 64 to determine one or more additional videos in which the user is likely to be interested. In some examples, product interest module 80 may base the determination on the received indication of user interest in the particular video. For example, where the particular product is a comedy movie and product interest module 80 receives an indication of user interest in the particular product, product interest module 80 may determine that the user is likely to be interested in one or more other comedy movies. Product interest module 80 may be further operable by processors 64 to output an indication of a preview video associated with the additional products. To continue with the previous example, product interest module 80 may output, for transmission to the computing device, a link to a preview video associated with one or more of the comedy movies.

Product status module 82 of reminder module 32 may be operable by processors 64 to determine whether or not the particular product in which the user is interested in is available for purchase. In some examples, product status module 82 may determine that the particular product is available for purchase in tandem with or independent of an external device, such as computing device 4 of FIG. 1. In some examples, product status module 82 may determine that the particular product is available for purchase by determining a release date for the particular product. In some examples, purchase may not require the exchange of money (i.e., the particular product may be available at no cost). In some examples, where the particular product is a video, the release data may be the date on which viewing rights may be acquired for the video. For instance, viewing rights may be acquired for the video if the video is available for public viewing in theaters, if physical media containing the video is publically available, if a license to stream the video is publically available, and/or if a license to download the video is publically available.

As another example, product status module 82 may determine that the particular product is available for purchase by determining that a location of a computing device, such as computing device 4, is near a location where the particular product is available for purchase. For instance, product status module 82 may receive data from the computing device that indicates a current location of the computing device. Product status module 82 may also receive data which indicates the location of one or more sources at which the particular product is available for purchase. In some examples, the data may also indicate the location of the particular product within at least one of the product sources. Product status module 82 may compare the current location of the computing device with the position of the one or more product sources. Product status module 82 may determine that the particular product is available for purchase if a distance between the location of the computing device and the location of the one or more sources is less than a first threshold value (e.g., one mile, five minutes travel time, etc.). In some examples, Product status module 82 may determine that the particular product is available for purchase if a distance between the location of the computing device and the location of the particular product within a location of the one or more product sources is less than a second threshold value (e.g., 50 feet). In some examples, product status module 82 may determine that the particular product is available for purchase where a location of the computing device is within the same aisle as the particular product.

In some examples, product status module 82 may determine that the particular product is available for purchase based on a location history of the computing device. For instance, if the particular product is available for purchase at a product source, product status module 82 may determine that the particular product is available for purchase if the location history of the computing device suggests that the computing device will be at the location of the product source within a threshold period of time (e.g., 15 min, 1 hour, 1 day, etc.). For example, if the particular product is potato chips, which are available for purchase at a grocery store, product status module 82 may determine that the potato chips are available for purchase if the location history of the computing device suggests that the computing device will be at the grocery store sometime that day.

In some examples, product status module 82 may determine when the particular product is available for purchase at a second time that may be later than the first time (i.e., when advertisement module 76 determined the advertisement). In some examples, if product status module 82 is unable to determine when the particular product will be available for purchase within a period of time (e.g., one day) after product interest module 80 receives the indication of the user interest, product status module 82 may periodically attempt to determine when the particular product will be available for purchase. In some examples, if product status module 82 is able to determine when the particular product will be available for public viewing within the period of time, product status module 82 may create record that causes notification module 84 to remind the user of his/her interest on or around the point when the particular video will be available for public viewing. In some examples, the record may be an entry of an electronic calendar of the user. In some examples, the record may be a scheduled task that causes notification module 84 to remind the user.

Notification module 84 of reminder module 32 may be operable by processors 64 to output a notification that the particular product is available for purchase. In some examples, notification module 84 may output the notification responsive to product status module 82 determining that the particular product is available for purchase. Notification module 84 may output the notification for transmission to a computing device, such as computing device 4.

Notification module 84, in some examples, may output information regarding the purchase of the particular product. For example, where the particular product is a video, notification module 84 may output the notification such that it includes information regarding the acquisition of viewing rights to the video. For instance, the notification may include information regarding the purchase of tickets to a showing of the particular video.

Figure 4:
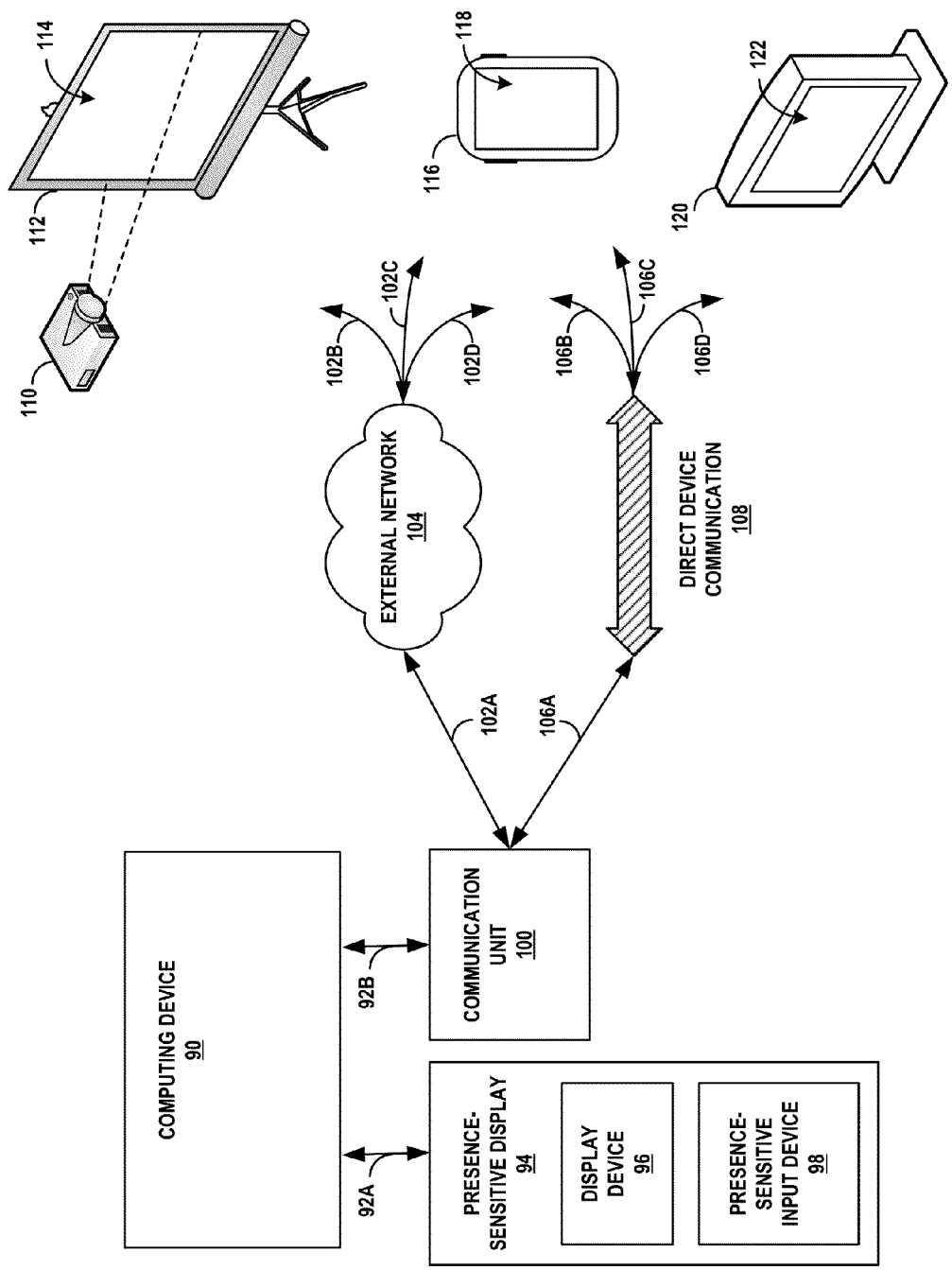
FIG. 4 is a block diagram illustrating an example system that outputs graphical content for display at a remote device, in accordance with one or more techniques of the present disclosure.

FIG. 4 is a block diagram illustrating an example computing device that outputs graphical content for display at a remote device, in accordance with one or more techniques of the present disclosure. Graphical content, generally, may include any visual information that may be output for display, such as text, images, a group of moving images, etc. The example shown in FIG. 4 includes a computing device 90, presence-sensitive display 94, communication unit 100, projector 110, projector screen 112, mobile device 116, and visual display device 120. Although shown for purposes of example in FIGS. 1 and 2 as stand-alone computing device 4, a computing device, such as computing device 90 may, generally, be any component or system that includes a processor or other suitable computing environment for executing software instructions and, for example, need not include a presence-sensitive display.

As shown in the example of FIG. 4, computing device 90 may be a processor that includes functionality as described with respect to processor 40 in FIG. 2. In such examples, computing device 90 may be operatively coupled to presence-sensitive display 94 by a communication channel 92A, which may be a system bus or other suitable connection. Computing device 90 may also be operatively coupled to communication unit 100, further described below, by a communication channel 92B, which may also be a system bus or other suitable connection. Although shown separately as an example in FIG. 4, computing device 90 may be operatively coupled to presence-sensitive display 94 and communication unit 100 by any number of one or more communication channels.

In other examples, such as illustrated previously by computing device 4 in FIGS. 1-2, a computing device may refer to a portable or mobile device such as mobile phones (including smart phones), wearable computing devices (including smart watches) laptop computers, etc. In some examples, a computing device may be a desktop computers, tablet computers, smart television platforms, cameras, personal digital assistants (PDAs), servers, mainframes, etc.

Presence-sensitive display 94, like UID 10 of FIG. 1, may include display device 96 and presence-sensitive input device 98. Display device 96 may, for example, receive data from computing device 90 and display the graphical content. In some examples, presence-sensitive input device 98 may determine one or more user inputs (e.g., continuous gestures, multi-touch gestures, single-touch gestures, etc.) at presence-sensitive display 94 using capacitive, inductive, and/or optical recognition techniques and send indications of such user input to computing device 90 using communication channel 92A. In some examples, presence-sensitive input device 98 may be physically positioned on top of display device 96 such that, when a user positions an input unit over a graphical element displayed by display device 96, the location at which presence-sensitive input device 98 corresponds to the location of display device 96 at which the graphical element is displayed. In other examples, presence-sensitive input device 98 may be positioned physically apart from display device 96, and locations of presence-sensitive input device 98 may correspond to locations of display device 96, such that input can be made at presence-sensitive input device 98 for interacting with graphical elements displayed at corresponding locations of display device 96.

As shown in FIG. 4, computing device 90 may also include and/or be operatively coupled with communication unit 100. Communication unit 100 may include functionality of communication unit 42 as described in FIG. 2. Examples of communication unit 100 may include a network interface card, an Ethernet card, an optical transceiver, a radio frequency transceiver, or any other type of device that can send and receive information. Other examples of such communication units may include Bluetooth, 3G, and Wi-Fi radios, Universal Serial Bus (USB) interfaces, etc. Computing device 90 may also include and/or be operatively coupled with one or more other devices, e.g., input devices, output devices, memory, storage devices, etc. that are not shown in FIG. 4 for purposes of brevity and illustration.

FIG. 4 also illustrates a projector 110 and projector screen 112. Other such examples of projection devices may include electronic whiteboards, holographic display devices, and any other suitable devices for displaying graphical content. Projector 110 and projector screen 112 may include one or more communication units that enable the respective devices to communicate with computing device 90. In some examples, the one or more communication units may enable communication between projector 110 and projector screen 112. Projector 110 may receive data from computing device 90 that includes graphical content. Projector 110, in response to receiving the data, may project the graphical content onto projector screen 112. In some examples, projector 110 may determine one or more user inputs (e.g., continuous gestures, multi-touch gestures, single-touch gestures, etc.) at projector screen using optical recognition or other suitable techniques and send indications of such user input using one or more communication units to computing device 90. In such examples, projector screen 112 may be unnecessary, and projector 110 may project graphical content on any suitable medium and detect one or more user inputs using optical recognition or other such suitable techniques.

Projector screen 112, in some examples, may include a presence-sensitive display 114. Presence-sensitive display 114 may include a subset of functionality or all of the functionality of UID 10 as described in this disclosure. In some examples, presence-sensitive display 94 may include additional functionality. Projector screen 112 (e.g., an electronic whiteboard), may receive data from computing device 90 and display the graphical content. In some examples, presence-sensitive display 114 may determine one or more user inputs (e.g., continuous gestures, multi-touch gestures, single-touch gestures, etc.) at projector screen 112 using capacitive, inductive, and/or optical recognition techniques and send indications of such user input using one or more communication units to computing device 80.

FIG. 4 also illustrates mobile device 116 and visual display device 120. Mobile device 116 and visual display device 120 may each include computing and connectivity capabilities. Examples of mobile device 116 may include e-reader devices, convertible notebook devices, hybrid slate devices, wearable computing devices, etc. Examples of visual display device 120 may include other semi-stationary devices such as televisions, computer monitors, etc. As shown in FIG. 4, mobile device 116 may include a presence-sensitive display 118. Visual display device 120 may include a presence-sensitive display 122. Presence-sensitive displays 118, 122 may include a subset of functionality or all of the functionality of UID 10 as described in this disclosure. In some examples, presence-sensitive displays 118, 122 may include additional functionality. In any case, presence-sensitive display 122, for example, may receive data from computing device 90 and display the graphical content. In some examples, presence-sensitive display 122 may determine one or more user inputs (e.g., continuous gestures, multi-touch gestures, single-touch gestures, etc.) at projector screen using capacitive, inductive, and/or optical recognition techniques and send indications of such user input using one or more communication units to computing device 90.

As described above, in some examples, computing device 90 may output graphical content for display at presence-sensitive display 94 that is coupled to computing device 90 by a system bus or other suitable communication channel. Computing device 90 may also output graphical content for display at one or more remote devices, such as projector 110, projector screen 112, mobile device 116, and visual display device 120. For instance, computing device 90 may execute one or more instructions to generate and/or modify graphical content in accordance with techniques of the present disclosure. Computing device 90 may output the data that includes the graphical content to a communication unit of computing device 90, such as communication unit 100. Communication unit 100 may send the data to one or more of the remote devices, such as projector 110, projector screen 112, mobile device 116, and/or visual display device 120. In this way, computing device 90 may output the graphical content for display at one or more of the remote devices. In some examples, one or more of the remote devices may output the graphical content at a presence-sensitive display that is included in and/or operatively coupled to the respective remote devices.

In some examples, computing device 90 may not output graphical content at presence-sensitive display 94 that is operatively coupled to computing device 90. In other examples, computing device 90 may output graphical content for display at both a presence-sensitive display 94 that is coupled to computing device 90 by communication channel 92A, and at one or more remote devices. In such examples, the graphical content may be displayed substantially contemporaneously at each respective device. For instance, some delay may be introduced by the communication latency to send the data that includes the graphical content to the remote device. In some examples, graphical content generated by computing device 90 and output for display at presence-sensitive display 94 may be different than graphical content display output for display at one or more remote devices.

Computing device 90 may send and receive data using any suitable communication techniques. For example, computing device 90 may be operatively coupled to external network 104 using network link 102A. Each of the remote devices illustrated in FIG. 4 may be operatively coupled to network external network 104 by one of respective network links 102B, 102C, and 102D. External network 104 may include network hubs, network switches, network routers, etc., that are operatively inter-coupled thereby providing for the exchange of information between computing device 90 and the remote devices illustrated in FIG. 4. In some examples, network links 102A-102D may be Ethernet, ATM or other network connections. Such connections may be wireless and/or wired connections.

In some examples, computing device 90 may be operatively coupled to one or more of the remote devices included in FIG. 4 using direct device communication 108. Direct device communication 108 may include communications through which computing device 90 sends and receives data directly with a remote device, using wired or wireless communication. That is, in some examples of direct device communication 108, data sent by computing device 90 may not be forwarded by one or more additional devices before being received at the remote device, and vice-versa. Examples of direct device communication 108 may include Bluetooth, Near-Field Communication, Universal Serial Bus, Wi-Fi, infrared, etc. One or more of the remote devices illustrated in FIG. 4 may be operatively coupled with computing device 90 by communication links 106A-106D. In some examples, communication links 106A-106D may be connections using Bluetooth, Near-Field Communication, Universal Serial Bus, infrared, etc. Such connections may be wireless and/or wired connections.

In accordance with techniques of the disclosure, computing device 90 may be operatively coupled to visual display device 120 using external network 104. Computing device 90 may output a graphical user interface that includes information about a particular product. For instance, computing device 90 may send data that includes a representation of the graphical user interface to communication unit 100. Communication unit 100 may send the data that includes the representation of the graphical user interface to visual display device 120 using external network 104. Visual display device 120, in response to receiving the data using external network 104, may cause presence-sensitive display 122 to output the graphical user interface. In response to a user performing a gesture at presence-sensitive display 122 (e.g., at a region of presence-sensitive display 122 that outputs the graphical user interface), visual display device 120 may send an indication of the gesture to computing device 90 using external network 104. Communication unit 100 of may receive the indication of the gesture, and send the indication to computing device 90.

In response to receiving an indication of at least one gesture detected at a presence-sensitive input device, computing device 90 may determine, based on the at least one gesture, that the user of computing device 90 is interested in the particular product. Responsive to determining, at a later time, that the particular product is available for purchase, computing device 90 may output a notification that the particular product is available for purchase for display at presence-sensitive display 122. For instance, computing device 90 may send data that includes a representation of the notification to communication unit 100. Communication unit 100 may send the data that includes the representation of the notification to visual display device 120 using external network 104. Visual display device 120, in response to receiving the data using external network 104, may cause presence-sensitive display 122 to output the notification.

Figure 5:
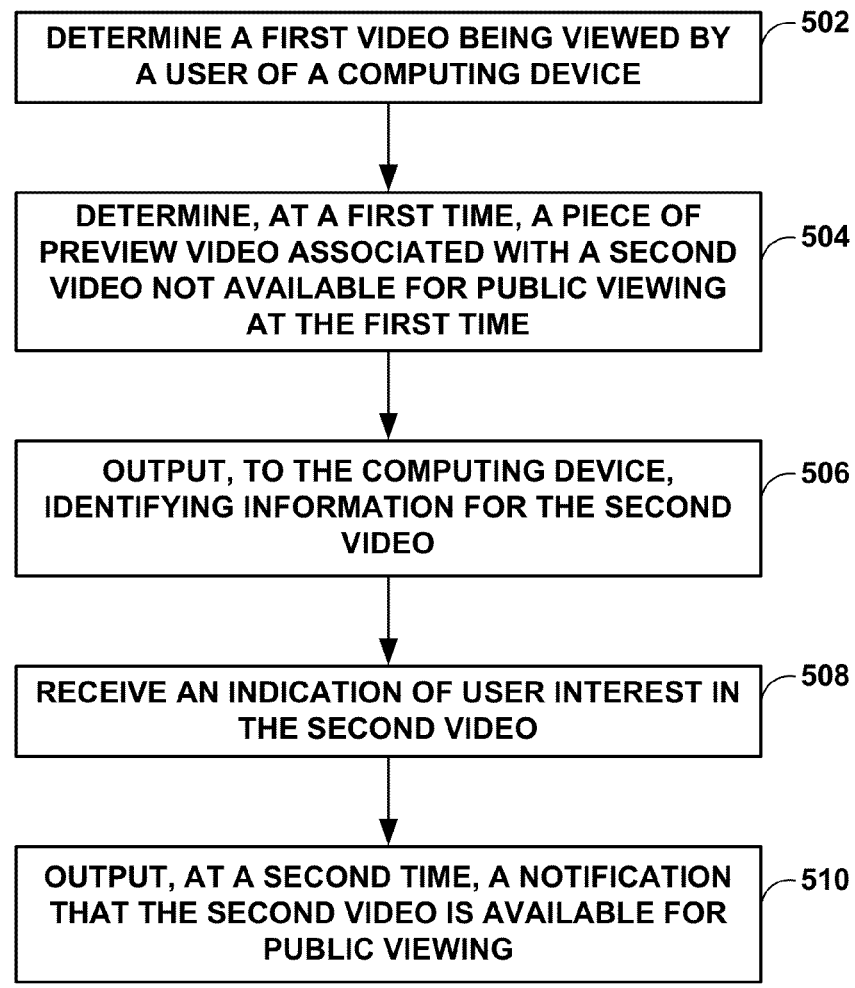
FIG. 5 is a flow diagram illustrating example operations of a server system to remind a user of his/her interest in a product at a computing device, in accordance with one or more techniques of the present disclosure.

FIG. 5 is a flow diagram illustrating example operations of a server system to remind a user of his/her interest in a product at a computing device, in accordance with one or more techniques of the present disclosure. The techniques of FIG. 5 may be performed by one or more processors of a server system, such as server system 6 illustrated in FIG. 1 and FIG. 3, or computing device 4 illustrated in FIG. 1 and FIG. 2 and computing device 90 illustrated in FIG. 4. For purposes of illustration, the techniques of FIG. 5 are described within the context of server system 6 of FIG. 1 and FIG. 3, although computing devices having configurations different than that of server system 6 may perform the techniques of FIG. 5.

In accordance with one or more techniques of the disclosure, video viewing module 74 of reminder module 32 of server system 6 may determine a first video being viewed by a user of a computing device (e.g., computing device 4 of FIG. 1) (502). As discussed above, video viewing module 74 may determine a movie being viewed by a user of the computing device at a movie theater.

Advertisement module 76 of reminder module 32 may determine, a first time, a piece of preview video associated with a second video not available for public viewing at the first time (504). As discussed above, the piece of preview video may be a movie trailer for the second movie that is viewed by the user of the computing device prior to the first movie.

Identification module 78 of reminder module 32 may then output, to the computing device, identifying information for the second video (506). As discussed above, the identifying information output by identification module 78 may include a title of the second video, a graphic associated with the second video, etc.

Product interest module 80 may then receive an indication of user interest in the second video (508). For example, product interest module 80 may receive an indication that indicates that the user is interested in the second video. As discussed above, product interest module 80 may receive the indication from the computing device.

Notification module 84 may then output, at a second time, a notification that the second video is available for public viewing (510). As discussed above, notification module 84 may output the notification responsive to determining that viewing rights to the second video are available for purchase. For example, where the second video is a movie, notification module 84 may output the notification when tickets for a showing of the movie are available for purchase.

Figure 6:
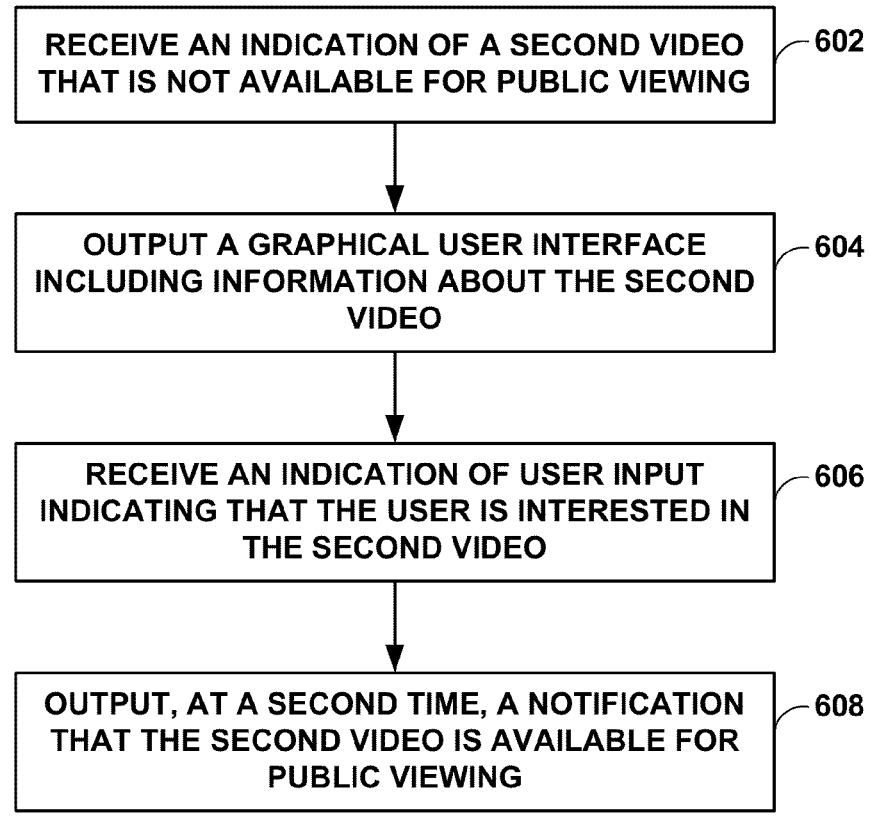
FIG. 6 is a flow diagram illustrating example operations of a computing device to remind a user of his/her interest in a product, in accordance with one or more techniques of the present disclosure.

FIG. 6 is a flow diagram illustrating example operations of a computing device to remind a user of his/her interest in a product, in accordance with one or more techniques of the present disclosure. The techniques of FIG. 6 may be performed by one or more processors of a computing device, such as computing device 4 illustrated in FIG. 1, FIG. 2, and FIG. 4, or server system 6 illustrated in FIG. 1 and FIG. 3. For purposes of illustration, the techniques of FIG. 6 are described within the context of computing device 4 illustrated in FIG. 1, FIG. 2, and FIG. 4, although computing devices having configurations different than that of computing device 4 may perform the techniques of FIG. 6.

In accordance with one or more techniques of this disclosure, communication module 14 of computing device 4 may receive an indication of a second video that is not available for public viewing (602). For example, communication module 14 may receive information about a movie for which a user of computing device 4 has viewed or will shortly view a trailer. As discussed above, communication module 14 may receive the information about the second video from an external device, such as server system 6 of FIG. 1.

Product interest module 58 of reminder module 16 may output a graphical user interface including information about the second video (604). As discussed above, product interest module 58 may output the graphical user interface to prompt the user of computing device 4 to provide input that indicates whether or not the user is interested in the second video. Also as discussed above, product interest module 58 may cause user interface module 12 of computing device 4 to output the graphical user interface.

Product interest module 58 may then receive an indication of user input that the user is interested in the second video (606). For example, product interest module 58 may receive an indication that the user of computing device 4 is interested in the movie for which the user recently viewed the trailer. As discussed above, product interest module 58 may receive the indication from user interface module 12.

Notification module 62 of reminder module 16 may then output, at a second time, a notification that the second video is available for public viewing (608). As discussed above, notification module 62 may output the notification responsive to determining that the second video is available for public viewing. Also as discussed above, the notification may include information regarding the purchase of viewing rights (i.e., tickets) to a showing of the second video.

Example 1

A method comprising: determining, by a computing system, a first video being viewed by a user of a computing device; determining, by the computing system and at a first time, one or more pieces of preview video associated with one or more videos different from the first video, wherein the one or more videos are not available for public viewing at the first time; outputting, by the computing system, for transmission to the computing device, identifying information for a particular video from the one or more videos, such that the computing device outputs information about the particular video; receiving, by the computing system and from the computing device, an indication of user interest in the particular video; and responsive to determining at a second time, later than the first time, that the particular video is available for public viewing, outputting, by the computing system and for transmission to the computing device, a notification that the particular video is available for public viewing.

Example 2

The method of example 1, receiving, by the computing system and from a database, information indicating user interest in one or more other videos; comparing, by the computing system, one or more attributes of the one or more other videos with one or more attributes of the one or more videos; determining, by the computing system, based at least in part on the comparing, the particular video; and outputting, by the computing system, for transmission to the computing device, the identifying information for the particular video.

Example 3

The method of any combination of examples 1-2, wherein determining the one or more pieces of preview video associated with the one or more videos different from the first video comprises one or more of: analyzing, by the computing system, audio data associated with a portion of a piece of preview video of the one or more pieces of preview video shown prior to the first video to identify a video of the one or more videos that corresponds to the portion of the preview video; and receiving, by the computing system and from a database, information indicating which portions of the preview video are scheduled to be shown prior to the first video.

Example 4

The method of any combination of examples 1-3, further comprising: determining, based on the received indication of user interest in the particular video, one or more additional videos in which the user is likely to be interested; and outputting, by the computing system and for transmission to the computing device, an indication of a preview video associated with the additional video.

Example 5

The method of any combination of examples 1-4, wherein outputting the notification that the particular video is available for public viewing further comprises: outputting, by the computing system and for transmission to the computing device, information regarding the purchase of tickets for the particular video.

Example 6

The method of any combination of examples 1-5, wherein determining the first video being viewed by the user of the computing device comprises: determining that the user has purchased one or more tickets to a showing of the first video.

Example 7

The method of any combination of examples 1-6, wherein the first video is a first movie, wherein the particular video is a second movie, and wherein at least one of the one or more pieces of preview video is a trailer associated with the second movie.

Example 8

A computing system comprising: one or more processors; and at least one module executable by the one or more processors to: determine a first video being viewed by a user of a computing device; determine, at a first time, one or more pieces of preview video associated with one or more videos different from the first video, wherein the one or more videos are not available for public viewing at the first time; output, for transmission to the computing device, identifying information for a particular video from the one or more videos, such that the computing device outputs information about the particular video; receive, from the computing device, an indication of user interest in the particular video; and responsive to determining at a second time, later than the first time, that the particular video is available for public viewing, output, for transmission to the computing device, a notification that the particular video is available for public viewing.

Example 9

The computing system of example 8, wherein the at least module is further executable by the one or more processors to: determine the particular video from the one or more videos based on one or more preferences of the user of the computing device.

Example 10

The computing system of any combination of examples 8-9, wherein the at least one module is executable by the one or more processors to determine the one or more pieces of preview video associated with the one or more videos different from the first video by at least one or both of: analyzing audio data associated with a portion of a piece of preview video shown prior to the video to identify a video of the one or more videos that corresponds to the piece of preview video; and receive, from a database, information indicating which pieces of preview video are scheduled to be shown prior to the first video.

Example 11

The computing system of any combination of examples 8-10, wherein the at least module is further executable by the one or more processors to: determine, based on the received indication of user interest in the particular video, one or more additional videos in which the user is likely to be interested; output, for transmission to the computing device, an indication of a preview video associated with the additional video.

Example 12

The computing system of any combination of examples 8-11, wherein the at least one module is executable by the one or more processors to output the notification that the particular video is available for public viewing by at least: outputting, for transmission to the computing device, information regarding the purchase of tickets for the particular video.

Example 13

The computing system of any combination of examples 8-12, wherein the at least one module is executable by the one or more processors to determine the first video being viewed by the user of the computing device by at least: determining that the user has purchased one or more tickets to a showing of the first video.

Example 14

A method comprising: receiving, by a computing device and at a first time, an indication of a particular video of one or more videos, wherein the one or more videos are not available for public viewing at the first time, and wherein each video of the one or more videos is associated with one or more pieces of preview video viewed by a user of the computing device prior to the user viewing a non-preview video; outputting, by the computing device, a graphical user interface including information about the particular video; receiving, by the computing device, an indication of user input detected by an input device, the user input indicating that the user is interested in the particular video; and responsive to determining at a second time, later than the first time, that the particular video is available for public viewing, outputting, by the computing device and for display, a notification that the particular video is available for public viewing.

Example 15

The method of example 14, further comprising identifying the particular video, wherein the identifying comprises: receiving, from an external device, information that identifies the particular video; or receiving, by the computing device, audio data associated with a portion of a piece of preview video of the one or more pieces of preview video; comparing the audio data associated with the portion of the piece of preview video with audio data of one or more preview videos available for viewing at a video sharing website to identify the particular video; and identifying the particular video based at least in part on the comparing.

Example 16

The method of any combination of examples 14-15, wherein the graphical user interface including the information about the particular video from the one or more videos is output in response to determining that the first video has finished playing, and wherein determining that the video has finished playing comprises one or more of: determining that the user has left a movie theater; determining, based on a runtime of the video, that the video has finished playing; determining that a display of the computing device is turned on; and determining that the computing device exited a limited functionality operating mode.

Example 17

The method of any combination of examples 14-16, further comprising: determining, based on the received indication of user interest in the particular video, one or more additional videos in which the user is likely to be interested; and outputting, for display, an indication of a preview video associated with the additional video.

Example 18

The method of any combination of examples 14-17, wherein outputting the notification that the particular video is available for public viewing further comprises: outputting, by the computing device and for display, information regarding the purchase of tickets for the particular video.

Example 19

The method of any combination of examples 14-18, wherein the non-preview video is a first movie, wherein the particular video is a second movie, and wherein at least one of the one or more pieces of preview video is a trailer associated with the second movie.

Example 20

A computing device comprising: one or more processors; and at least one module executable by the one or more processors to: receive, at a first time, an indication of a particular video of one or more videos, wherein the one or more videos are not available for public viewing at the first time, and wherein each video of the one or more videos is associated with one or more pieces of preview video viewed by a user of the computing device prior to the user viewing a non-preview video; output a graphical user interface including information about the particular video of the one or more videos; receive an indication of user input detected by an input device, the user input indicating that the user is interested in the particular video; and responsive to determining at a second time, later than the first time, that the particular video is available for public viewing, output for display, a notification that the particular video is available for public viewing.

Example 21

The computing device of example 20, wherein the at least one module is executable by the one or more processors to identify the particular video by either or both of: receiving, from an external device, information that identifies the particular video; or receiving, by the computing device, audio data associated with a portion of a piece of preview video of the one or more pieces of preview video; comparing the audio data associated with the portion of the piece of preview video with audio data of one or more preview videos available for viewing at a video sharing website to identify the particular video; and identifying the particular video based at least in part on the comparing.

Example 22

The computing device of any combination of examples 20-21, wherein the at least one module is executable by the one or more processors to output the graphical user interface including the information about the particular video of the one or more videos in response to determining that the first video has finished playing, and wherein the at least one module is executable by the one or more processors to determine that the first video has finished playing by at least one or more of: determining that the user has left a movie theater; determining, based on a runtime of the first video, that the first video has finished playing; determining that a display of the computing device is turned on; and determining that the computing device exited a limited functionality operating mode.

Example 23

The computing device of any combination of examples 20-22, wherein the at least one module is further executable by the one or more processors to: determine, based on the received indication of user interest in the particular video, one or more additional videos in which the user is likely to be interested; and output, for display, an indication of a preview video associated with the additional video.

Example 24

The computing device of any combination of examples 20-23, wherein the at least one module is executable by the one or more processors to output the notification that the particular video is available for public viewing by at least: outputting, for display, information regarding the purchase of tickets for the particular video.

Example 25

A computer-readable storage medium comprising instructions that, when executed, configure one or more processors of a computing system to: determine a first video being viewed by a user of a computing device; determine, at a first time, one or more pieces of preview video associated with one or more videos different from the first video, wherein the one or more videos are not available for public viewing at the first time; output, for transmission to the computing device, identifying information for a particular video from the one or more videos, such that the computing device outputs information about the particular video; receive, from the computing device, an indication of user interest in the particular video; and responsive to determining at a second time, later than the first time, that the particular video is available for public viewing, output, for transmission to the computing device, a notification that the particular video is available for public viewing.

Example 26

The computer-readable storage medium of example 25, wherein the instructions that configure the one or more processors to determine the one or more pieces of preview video associated with the one or more videos different from the first video comprise instructions that configure the one or more processors to one or both of: analyze audio data of a piece of preview video output prior to the video to identify a video of the one or more videos that corresponds to the piece of preview video; and receive, from a database, information indicating which pieces of preview video are scheduled to be output prior to the first video.

Example 27

The computer-readable storage medium of any combination of examples 25-26, further comprising instructions that configure the one or more processors to: determine, based on the received indication of user interest in the particular video, one or more additional videos in which the user is likely to be interested; and output, for transmission to the computing device, an indication of a preview video associated with the additional video.

Example 28

The computer-readable storage medium of any combination of examples 25-27, wherein the instructions that configure the one or more processors to output the notification that the particular video is available for public viewing comprise instructions that configure the one or more processors to: output, for transmission to the computing device, information regarding the purchase of tickets for the particular video.

Example 29

The computer-readable storage medium of any combination of examples 25-28, wherein the instructions that configure the one or more processors to determine the first video being viewed by the user of the computing device comprise instructions that configure the one or more processors to: determine that the user has purchased one or more tickets to a showing of the first video.

Example 30

The computer-readable storage medium of any combination of examples 25-29, wherein the first video is a first movie, wherein the particular video is a second movie, and wherein at least one of the one or more pieces of preview video is a trailer associated with the second movie.

Example 31

A computer-readable storage medium comprising instructions that, when executed, configure one or more processors of a computing device to: receive, at a first time, an indication of a particular video of one or more videos, wherein the one or more videos are not available for public viewing at the first time, and wherein each video of the one or more videos is associated with one or more pieces of preview video viewed by a user of the computing device prior to the user viewing a non-preview video; output a graphical user interface including information about the particular video of the one or more videos; receive an indication of user input detected by an input device, the user input indicating that the user is interested in the particular video; and responsive to determining at a second time, later than the first time, that the particular video is available for public viewing, output for display, a notification that the particular video is available for public viewing.

Example 32

The computer-readable storage medium of example 31, further comprising instructions that configure the one or more processors to: determine, based on the one or more pieces of preview video, the particular video.

Example 33

The computer-readable storage medium of any combination of examples 31-32, further comprising instructions that configure the one or more processors to identify the particular video, wherein the instructions that configure the one or more processors to identify the particular video comprise instructions that configure the one or more processors to either or both of: receive, from an external device, information that identifies the particular video; or receive audio data associated with the one or more pieces of preview video; compare the audio data of at least one of the one or more pieces of preview video with audio data of one or more preview videos available for viewing at a video sharing website to identify the particular video; and identify the particular video based at least in part on the comparison.

Example 34

The computer-readable storage medium of any combination of examples 31-33, wherein the instructions that configure the one or more processors to output the graphical user interface including the information about the particular video of the one or more videos comprise instructions that configure the one or more processors to output the graphical user interface including the information about the particular video of the one or more videos in response to determining that the first video has finished playing, and wherein the instructions that configure the one or more processors to determine that the first video has finished playing comprise instructions that configure the one or more processors to one or more of: determine that the user has left a movie theater; determine, based on a runtime of the first video, that the first video has finished playing; determine that a display of the computing device is turned on; and determine that the computing device exited a limited functionality operating mode.

Example 35

The computer-readable storage medium of any combination of examples 31-34, further comprising instructions that configure the one or more processors to: determine, based on the received indication of user interest in the particular video, one or more additional videos in which the user is likely to be interested; and output, for display, an indication of a preview video associated with the additional video.

Example 36

The computer-readable storage medium of any combination of examples 31-35, wherein the instructions that configure the one or more processors to output the notification that the particular video is available for public viewing comprise instructions that configure the one or more processors to: output, for display, information regarding the purchase of tickets for the particular video.

Example 37

The computer-readable storage medium of any combination of examples 31-36, wherein the non-preview video is a first movie, wherein the particular video is a second movie, and wherein at least one of the one or more pieces of preview video is a trailer associated with the second movie.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described in this disclosure may also be embodied or encoded in an article of manufacture including a computer-readable storage medium encoded with instructions. Instructions embedded or encoded in an article of manufacture including a computer-readable storage medium encoded, may cause one or more programmable processors, or other processors, to implement one or more of the techniques described herein, such as when instructions included or encoded in the computer-readable storage medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media. In some examples, an article of manufacture may include one or more computer-readable storage media.

In some examples, a computer-readable storage medium may include a non-transitory medium. The term "non-transitory" may indicate that the storage medium is not embodied in a carrier wave or a propagated signal. In certain examples, a non-transitory storage medium may store data that can, over time, change (e.g., in RAM or cache).

Various examples of the invention have been described. These and other examples are within the scope of the following claims.

The invention claimed is:

1. A method comprising:
   determining, by a computing system, a first video being viewed by a user of a computing device;
   determining, by the computing system and at a first time, one or more pieces of preview video associated with one or more videos different from the first video, wherein the one or more videos are not available for public viewing at the first time;
   outputting, by the computing system, for transmission to the computing device, identifying information for a particular video from the one or more videos, to cause the computing device to output information about the particular video and a prompt for the user of the computing device to provide user input indicating whether the user is interested in the particular video after the user has left a display location of the first video;
   receiving, after outputting the identifying information for the particular video, by the computing system and from the computing device, information expressly indicating that the user of the computing device is interested in the particular video; and
   responsive to determining at a second time, later than the first time, that the particular video is available for public viewing, outputting, by the computing system and for transmission to the computing device, a notification that the particular video is available for public viewing.

2. The method of claim 1, further comprising:
   receiving, by the computing system and from a database, information indicating user interest in one or more other videos;
   comparing, by the computing system, one or more attributes of the one or more other videos with one or more attributes of the one or more videos;
   determining, by the computing system, based at least in part on the comparing, the particular video; and
   outputting, by the computing system, for transmission to the computing device, the identifying information for the particular video.

3. The method of claim 1, wherein determining the one or more pieces of preview video associated with the one or more videos different from the first video comprises:
   receiving, by the computing system and from the computing device, audio data associated with a portion of a piece of preview video of the one or more pieces of preview video shown prior to the first video; and
   analyzing, by the computing system, the received audio data to identify a video of the one or more videos that corresponds to the portion of the preview video.

4. The method of claim 1, further comprising:
   determining, based on the received indication of user interest in the particular video, one or more additional videos in which the user is likely to be interested; and
   outputting, by the computing system and for transmission to the computing device, an indication of a preview video associated with the additional video.

5. The method of claim 1, wherein outputting the notification that the particular video is available for public viewing further comprises:
   outputting, by the computing system and for transmission to the computing device, information regarding the purchase of tickets for the particular video.

6. The method of claim 1, wherein determining the first video being viewed by the user of the computing device comprises:
   determining that the user has purchased one or more tickets to a showing of the first video.

7. The method of claim 1, wherein the first video is a first movie, wherein the particular video is a second movie, and wherein at least one of the one or more pieces of preview video is a trailer associated with the second movie.

8. The method of claim 1, wherein the display location of the first video is a movie theater.

9. The method of claim 3, wherein analyzing, by the computing system, the received audio data to identify a video of the one or more videos that corresponds to the portion of the preview video comprises:
   comparing the received audio data with audio data of one or more preview videos available for viewing at a video sharing website to identify the video of the one or more videos that corresponds to the portion of the preview video.

10. A computing system comprising:
    one or more processors; and
    at least one module executable by the one or more processors to:
       determine a first video being viewed by a user of a computing device;
       determine, at a first time, one or more pieces of preview video associated with one or more videos different from the first video, wherein the one or more videos are not available for public viewing at the first time;
       output, for transmission to the computing device, identifying information for a particular video from the one or more videos, to cause the computing device to output information about the particular video and a prompt for the user of the computing device to provide user input indicating whether the user is interested in the particular video after the user has left a display location of the first video;

receive, from the computing device and after outputting the identifying information for the particular video, information expressly indicating that the user of the computing device is interested in the particular video; and responsive to determining at a second time, later than the first time, that the particular video is available for public viewing, output, for transmission to the computing device, a notification that the particular video is available for public viewing.

11. The computing system of claim 10, wherein the at least module is further executable by the one or more processors to:
determine the particular video from the one or more videos based on one or more preferences of the user of the computing device.

12. The computing system of claim 10, wherein the at least one module is executable by the one or more processors to determine the one or more pieces of preview video associated with the one or more videos different from the first video by at least:
receiving, from the computing device, audio data associated with a portion of a piece of preview video of the one or more pieces of preview video shown prior to the first video; and
analyzing the received audio data to identify a video of the one or more videos that corresponds to the piece of preview video.

13. The computing system of claim 10, wherein the at least module is further executable by the one or more processors to:
determine, based on the received indication of user interest in the particular video, one or more additional videos in which the user is likely to be interested;
output, for transmission to the computing device, an indication of a preview video associated with the additional video.

14. The computing system of claim 10, wherein the at least one module is executable by the one or more processors to output the notification that the particular video is available for public viewing by at least:
outputting, for transmission to the computing device, information regarding the purchase of tickets for the particular video.

15. The computing system of claim 10, wherein the at least one module is executable by the one or more processors to determine the first video being viewed by the user of the computing device by at least:
determining that the user has purchased one or more tickets to a showing of the first video.

16. The computing system of claim 10, wherein the display location of the first video is a movie theater.

17. A method comprising:
receiving, by a computing device and at a first time, an indication of a particular video of one or more videos, wherein the one or more videos are not available for public viewing at the first time, and wherein each video of the one or more videos is associated with one or more pieces of preview video viewed by a user of the computing device prior to the user viewing a non-preview video;
responsive to determining that the non-preview video has finished playing, outputting, by the computing device, a graphical user interface including information about the particular video and a prompt for the user to provide user input indicating whether the user is interested in the particular video, wherein determining that the non-preview video has finished playing comprises one or more of: determining that the user has left a display location of the non-preview video, determining that a display of the computing device is turned on, and determining that the computing device exited a limited functionality operating mode;
receiving, by the computing device and after outputting the graphical user interface that includes the prompt, an indication of user input detected by an input device, the user input expressly indicating that the user is interested in the particular video; and
responsive to determining at a second time, later than the first time, that the particular video is available for public viewing, outputting, by the computing device and for display, a notification that the particular video is available for public viewing.

18. The method of claim 17, further comprising identifying the particular video, wherein the identifying comprises:
receiving, by the computing device, audio data associated with a portion of a piece of preview video of the one or more pieces of preview video; and
identifying the particular video based at least in part on the audio data associated with the portion of the piece of preview video.

19. The method of claim 17, wherein outputting the notification that the particular video is available for public viewing further comprises:
outputting, by the computing device and for display, information regarding the purchase of tickets for the particular video.

20. The method of claim 17, wherein the non-preview video is a first movie, wherein the particular video is a second movie, and wherein at least one of the one or more pieces of preview video is a trailer associated with the second movie.

21. The method of claim 17, wherein determining that the user has left the display location of the non-preview video comprises determining that the user has left the movie theater, and wherein determining that the user has left the movie theater comprises:
determining that a distance between a current location of the computing device and a location of the theater is greater than a threshold distance.

22. The method of claim 18, further comprising:
outputting, by the computing device, for transmission to a server device, the audio data associated with the portion of the piece of preview video, wherein identifying the particular video based at least in part on the audio data associated with the portion of the piece of preview video comprises:
receiving, by the computing device and from the server device, identifying information for the particular video.

23. A computing device comprising:
one or more processors; and
at least one module executable by the one or more processors to:
receive, at a first time, an indication of a particular video of one or more videos, wherein the one or more videos are not available for public viewing at the first time, and wherein each video of the one or more videos is associated with one or more pieces of preview video viewed by a user of the computing device prior to the user viewing a non-preview video;
output, in response to determining that the non-preview video has finished playing, a graphical user interface including information about the particular video of the one or more videos and a prompt for the user to provide user input indicating whether the user is interested in the particular video, wherein determining that the non-preview video has finished playing comprises one or more of: determining that the user has left a display location of the non-preview video, determining that a display of the computing device is turned on, and determining that the computing device exited a limited functionality operating mode;

receive, after outputting the graphical user interface that includes the prompt, an indication of user input detected by an input device, the user input expressly indicating that the user is interested in the particular video; and responsive to determining at a second time, later than the first time, that the particular video is available for public viewing, output for display, a notification that the particular video is available for public viewing.

24. The computing device of claim 23, wherein the at least one module is executable by the one or more processors to identify the particular video by at least:

receiving, by the computing device, audio data associated with a portion of a piece of preview video of the one or more pieces of preview video; and identifying the particular video based at least in part on the audio data associated with the portion of the piece of preview video.

25. The computing device of claim 23, wherein the at least one module is executable by the one or more processors to output the notification that the particular video is available for public viewing by at least:

outputting, for display, information regarding the purchase of tickets for the particular video.

26. The computing device of claim 23, wherein the at least one module is executable by the one or more processors to determine that the user has left the display location of the non-preview video by at least determining that the user has left the movie theater, and wherein the at least one module is executable by the one or more processors to determine that the user has left the movie theater by at least:

determining that a distance between a current location of the computing device and a location of the theater is greater than a threshold distance.

* * * * *